United States Patent

Henry et al.

[15] 3,671,676

[45] June 20, 1972

[54] SUBSCRIBER LOOP RANGE EXTENDER

[72] Inventors: James L. Henry; Luther G. Schimpf, both of Holmdel, N.J.

[73] Assignee: Bell Telephone Laboratories, Incorporated, Murray Hill, Berkeley Heights, N.J.

[22] Filed: Dec. 17, 1969

[21] Appl. No.: 885,949

[52] U.S. Cl. ....................179/16 F

[51] Int. Cl. ....................H04g 1/30

[58] Field of Search ....................179/16 E, 16 EA, 16 F, 170 R, 179/170 G

[56] References Cited

UNITED STATES PATENTS

| | | | |
|---|---|---|---|
| 3,493,686 | 2/1970 | Spittler et al. | 179/16 F |
| 3,465,104 | 9/1969 | Zebe | 179/16 F |
| 3,339,027 | 8/1967 | Feiner et al | 179/16 F |

*Primary Examiner*—William C. Cooper
*Assistant Examiner*—Randall P. Myers
*Attorney*—R. J. Guenther and Edwin B. Cave

[57] ABSTRACT

This disclosure describes a telephone subscriber loop range extender having a signaling mode and a transmission mode. In the former, a resistive shunt is applied across the loop with each dial pulse to aid operation of the pulsing relay for an originating cell. For a terminating call, the shunt is applied upon answer, either during ringing or during the silent interval, to aid operation of the ring-trip relay. In the transmission mode, voice frequency gain and greater transmitter voltage are applied to the loop. A control circuit consisting of logic, timing and relay driving circuits, acts upon loop voltage and current data to control shunt action and mode selection.

9 Claims, 6 Drawing Figures

INVENTORS
J. L. HENRY
L. G. SCHIMPF
BY Charles E. Graves
ATTORNEY

SUBSCRIBER LOOP RANGE EXTENDER

BACKGROUND OF THE INVENTION

This invention relates to telephonic signaling combined with transmission over subscriber loops and more specifically to loop range extenders.

Accurate detection at a central office of switchhook signals from a rotary dial subscriber set is dependent on the level and shape of the received pulse. Signal attenuation and distortion increase with loop length. On loops above about 1,300–1,500 ohms resistance, detection with conventional equipment is not sufficiently reliable.

In the T. L. Henry et al., U.S. Pat. No. 3,508,009 issued April 2, 1970, there is described a loop range extender that reduces the risk of signaling detection errors in long loops. In that scheme, a resistive shunt is placed across the loop when current is detected. The shunt is disabled after a timed interval to ensure maximum current at the subscriber set during talking. The shunt is also disabled in the presence of ringing current to avoid premature ring-trip.

While fully meeting the purposes for which designed, this range extender did not fulfill certain desirable functions. For one, detection of signals occurred only on one polarity, a condition which required a duplicate second circuit for detection of the opposite polarity. Moreover, the earlier system did not provide any enhancement for the transmission mode.

Importantly, the earlier range extender circuit had no provision for detecting an answer during the ringing interval. In consequence, during this time segment no assistance to the ring-trip relay was given, which in some instances permitted the ringing to continue for a brief interval beyond answer.

A range extender must further avoid converting the longitudinal loop currents into metallic noise. Voice frequency gain is also to be desired, its realization being, however, dependent on a practical low cost implementation. Further, the central office battery voltage applied to the loop during talking should advantageously be increased on long loops to maintain the transmitter output at a desirable level.

Accordingly, the following are all important inventive objects:

- broadly, to provide further capability to extend subscriber loop range;
- to effectively detect signals of either polarity in a subscriber loop;
- to distinguish between transmission and signaling modes;
- to accommodate routine tests made on the loop by central office equipment or the local test desk;
- to detect ring-trip on either single party or multiparty lines; and
- to avoid aggravating any loop noise condition.

SUMMARY OF THE INVENTION

In the loop range extender of the present invention, tip-and-ring leads are normally connected on a straight-through basis in the signaling (including ringing) mode. Ring-tip voltage and loop current are monitored, the latter by a detector that presents low resistance in series with the loop but a large impedance from tip to ring.

Pulsing is processed by detecting when loop current is above a given threshold and thereupon inserting a tip-ring resistive shunt to aid the operation of the central office pulsing relay. A control circuit consisting of logic, timing, and relay driving circuits controls the resistive shunt and a transfer circuit which will be described shortly. When a call to a line is answered the control circuit acts on the voltage and current data so that the tip-ring shunt can be switched in either during the interval ringing voltage is on the loop or in the silent interval. The resistive shunt, in this case, assists the operation of the ring-trip relay by providing additional current.

When the loop has been closed for an interval longer than the closed intervals in a dial pulse train, the logic and timing circuit initiates a transfer to a transmission path or mode. Included in this path is voice frequency gain, provision for impedance matching to ensure a satisfactory loss condition, and a higher voltage battery for supplying energy to the subscriber loop.

Advantageously, when the loop is open or the tip and ring are started together during tests from the local test desk, for example, the range extender remains in the signaling mode and shifts to the transmission mode only when a loop is closed and talking battery is supplied to the loop.

The invention and its further objects, features and advantages will be readily apprehended from a reading of the detailed description to follow.

GENERAL DESCRIPTION OF AN ILLUSTRATIVE EMBODIMENT

Figure 1:
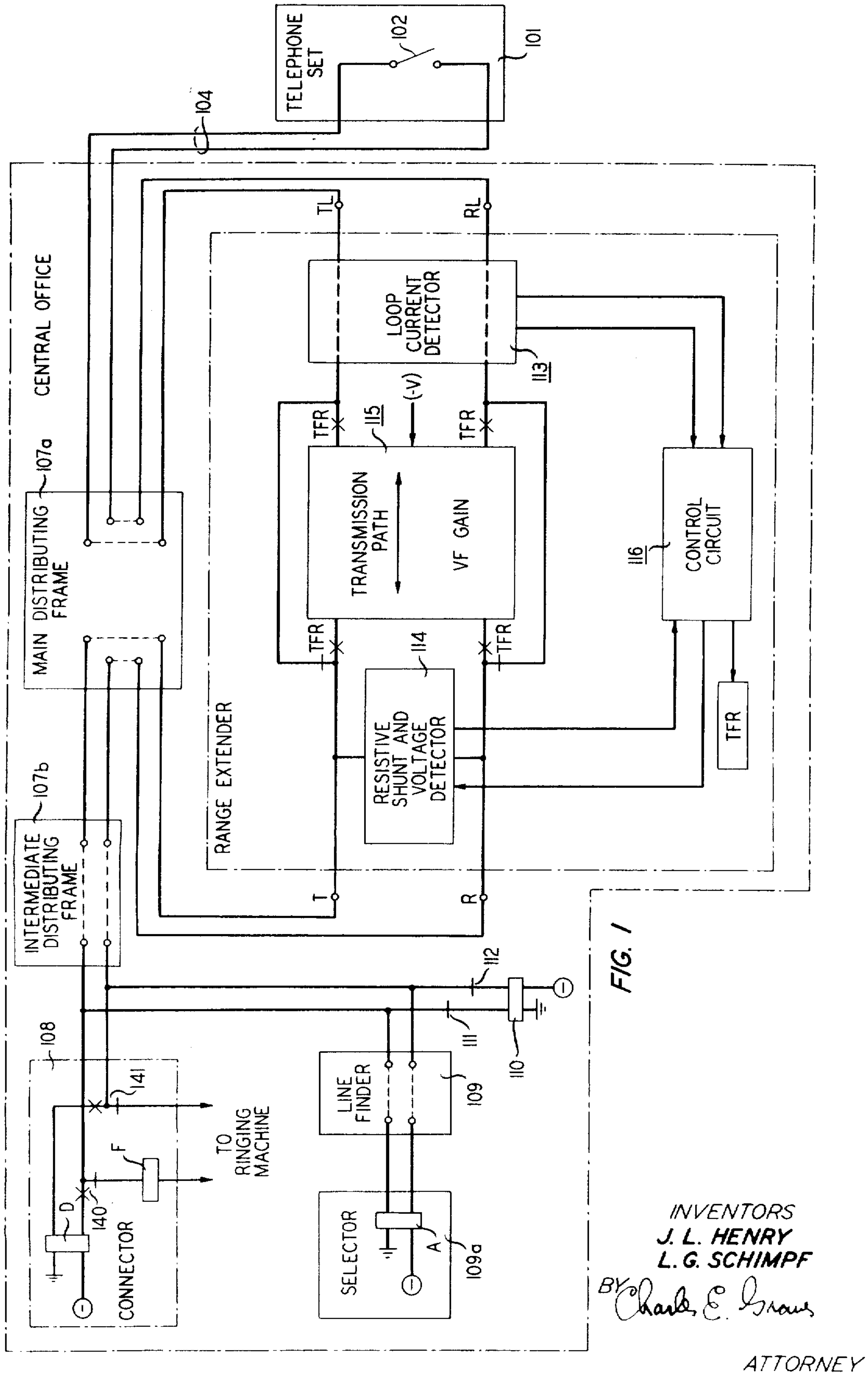
FIG. 1 is a circuit block diagram of a subscriber loop system incorporating the present invention.

FIG. 1 depicts the environment in which the invention operates. A telephone set 101 including a switchhook 12 is connected to a central office 103 via a line loop 104. The range extender 105 located in the central office is connected to loop 104 at the terminals TL, RL; and to main distributing frame 107*a* through the terminals T, R. The main distributing frame is connected to the intermediate distributing frame 107*b*. From frame 107*b*, connection is made to connector 108, line finder 109, and line relay 110. A line cutoff relay, not shown, operates the transfer contacts 111, 112.

Figure 6:
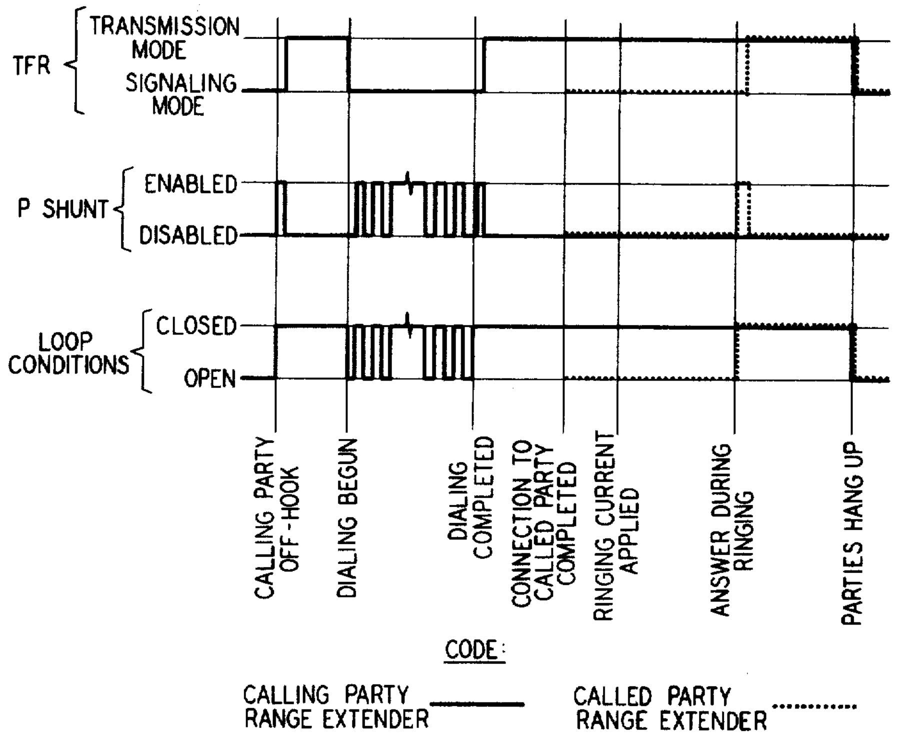
FIG. 6 is a graph depicting shunt operation and circuit mode condition as a function of loop condition.

As illustrated in FIG. 6, closure of loop 104 occurs when switchhook 102 goes off-hook at telephone set 101. Loop closure operates line relay 110, with the assistance of the range extender, over the path including the break contacts 111, 112 of the line cutoff relay. Operation of line relay 110 also closes a work contact (not shown) to start line finder 109. When the latter finds the calling line 104, it operates a line cutoff relay (not shown) which operates break contacts 111, 112 to remove line relay 110 from the circuit and connect the loop 104 to the line finder 109. Dial tone is then applied to the loop 104 from the selector 109*a* associated with the line finder 109.

Range extender 105 as depicted in FIG. 1 consists of loop current detector 113, voltage detector and resistive shunt relay circuit 114, transmission path 115 which includes voice frequency gain, and control circuit 116. The latter controls the TFR relay and the shunt relay P. The TFR relay switches range extender 105 between its transmission and signaling modes; and the relay P switches the resistive shunt in and out of loop 104.

Pursuant to the invention, loop current detector 113 supplies first and second inputs V, V' to circuit 116. Both inputs are approximately linearly proportional to loop current. Input V is substantially an exact replica of the loop current with minor delays in reporting the loop current; but input V' has a rise time of about 200 milliseconds and a like fall time.

Voltage detector 114 primarily detects presences of high voltage on the loop, signifying that either ringing voltage or relay surge is present. This information is the third input to circuit 116.

For an originating call, current above a given threshold as indicated by the input V signifies to circuit 116 the presence of loop closure. Conversely, input V disappears when the loop is opened. In response, circuit 116 places a resistive shunt from tip to ring to aid the line relay and the pulsing relay, by making the long loop appear electrically shorter. When the loop 104 has been closed for an interval slightly in excess of the closed intervals in the dial pulse train, circuit 116 operates relay TFR to initiate a transfer to the transmission path 115. Gain is added to the loop, and applied loop voltage is increased so that transmitter current at set 101 is such that the transmitter output at station 101 stays within a desired range.

Working in conjunction with a called party long loop, the range extender combines the loop voltage and current data inputs in circuit 116 to control the resistive shunt so that ringing currents do not cause a premature operation of a ring-trip relay.

DETAILED DESCRIPTION

Figure 2:
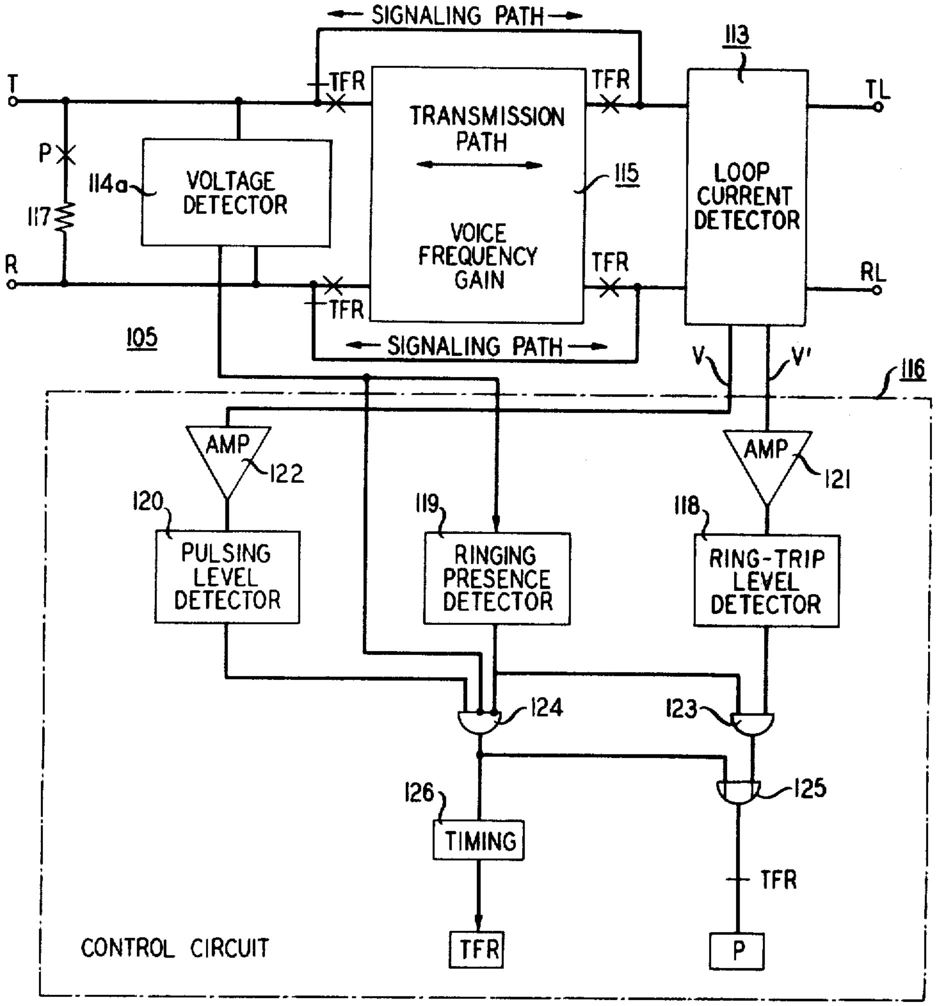
FIG. 2 is a circuit block diagram of the inventive range extender.

FIG. 2 shows range extender 105 in functional block diagram form. Circuit 114 comprises a voltage detector 114*a*, a resistive shunt 117, and the shunt-controlling relay P contact. Control circuit 116 contains ring-trip level detector 118, ringing presence detector 119, and pulsing level detector 120. Input V' from loop current detector 113 passes through amplifier 121 for processing in ring-trip level detector 118. Input V passes through amplifier 122 for processing in pulsing level detector 120. As later described in conjunction with FIG. 3, detector 120 has the characteristic of shifting its level of detection to take into account the effects on the loop current, as experienced at the loop current detector 113, when resistive shunt 117 is switched in and out of the circuit.

The operating sequence described below are more readily understood with the aid of FIG. 6 which depicts shunt action as a function of loop condition and of relay TFR condition, first for the range extender functioning with an originating call and then for the range extender functioning with a terminating call.

Calling Party Switchhook Closure

Following closure of switchhook 102, line current builds up in loop 104. In 3 to 6 milliseconds, current reaches the pulsing level detector 120 threshold designated $T_1$ in FIG. 3. Detector 120 thereupon applies an output to the three-input AND gate 124. The other two inputs to AND gate 124 are from ringing presence detector 119 and from voltage detector 114*a*; these two inputs undergo a logic inversion before insertion.

With no high voltage present due to ringing or relay surge, with no output from ringing presence detector 119, and with an output from detector 120, AND gate 124 is activated and energizes timer 126. Concurrently, via OR gate 125, AND gate 124 operates the relay P, connecting shunt 117 across loop 104. Presence of shunt 117 at this time aids the operation of line relay 110.

Provided the first digit has not yet been dialed, after an interval of from 60 milliseconds to about 1 second, advantageously within the range 100–150 milliseconds, relay TFR is powered. This establishes the transmission path connection; and dial tone is received by the calling party. With operation of relay TFR, a break contact thereof deenergizes relay P, and hence disconnects shunt 117.

Dialing

A pulse train is initiated at station 101, and with the first open loop, an oscillatory voltage surge is released by pulsing relay A in selector 109*a*, which is detected by voltage detector 114*a*. Ringing presence detector 119 has the characteristic of recognizing that the rate per second of the voltage surges produced by dialing is below the characteristic rate for 20 Hz ringing current. The no-output condition of detector 119, inverted, thus continues to provide an input to AND gate 123. Voltage detector 114*a*, however detects the surge; and its output inverted causes AND gate 124 to deenergize relay TFR. Relay TFR therefore releases, reinstating the signaling path.

Also, relay P immediately releases following loop opens during dialing, due to detection of the relay voltage surges and the action of AND gate 124 as described above for relay TFR. This action removes shunt 117 from loop 104 during the pulse-open period.

As timer 126 generates no output unless given an input for larger than the pulse (or loop) closed period, relay TFR stays down for the duration of the pulse train, thus keeping the range extender 105 in its signaling mode throughout dialing. The shunt 117, however, is reinstated across loop 104 pursuant to the invention, for each closed loop interval in the pulse train.

Thus, the P contact is opened and closed in the foregoing fashion, substantially coincidentally with the opening and closing of the loop during dialing. With shunt 117 connected, loop resistance appears to pulsing relay A to be about 1,100 ohms. When the loop is open, shunt 117 is removed to enable the pulsing relay A to then release. The use of both voltage and loop current information from the loop makes it possible to control shunt 117 in such a way as to aid the pulsing relay and to deduce the pulse distortion caused by the pulsing relay A when its release is (absent the present invention) slowed down by the high capacitance of long loops.

Dialing Completed; Ringing Begun

With completion of any one digit of a dialed number, including of course the last digit, loop current moves toward a steady state value of about 14 milliamperes, which causes an output from detector 120. After the timing delay, the TFR relay is operated, placing the range extender into its transmission mode. Additionally, operation of relay TFR causes relay P to release, removing shunt 117. Release of relay P in this order prevents generation of a false dial pulse which might otherwise occur, and assures circuit continuity from loop 104 to central office 103 during transmission.

Terminating Call

When the switching system of central office 103 completes a call to the long loop 104, range extender 105 monitors the loop but does not operate relay P or relay TFR until the call is answered. It is desirable that relay P be operated as soon as an answer occurs, be it during ringing or during the silent period. Pursuant to the invention, answer during ringing, as depicted in FIG. 6 provides AND gate 123 with coincident outputs from ring-trip level detector 118 and ringing presence detector 119. The output of AND gate 123 passes through OR gate 125 which operates relay P and switches in shunt 117. This helps to assure ring-trip by increasing loop current to operate ring-trip relay F in connector 108. Following answer and the operation of ring-trip relay F, the loop is connected through contacts 140, 141 to relay D which supplies talking battery and ground. Loop current flows and is detected by detector 120. The output of detector 120 opens AND gate 124 triggering timer 126 which operates relay TFR to transfer the loop to the transmission circuit and cause release of relay P.

Answer during the silent interval also operates the P relay, but through a different process. Pulsing level detector 120 reports loop closure at the remote end. Ringing and high voltage are both absent from the loop. The coincidence of these conditions operate AND gate 124 which through OR gate 125 energizes relay P. The latter is then taken down by the same cycling sequence as described in the preceding paragraph.

In its preferred embodiment, the invention is practiced with certain expedients now to be described.

Pulse Level Detector Thresholds

Figure 3:
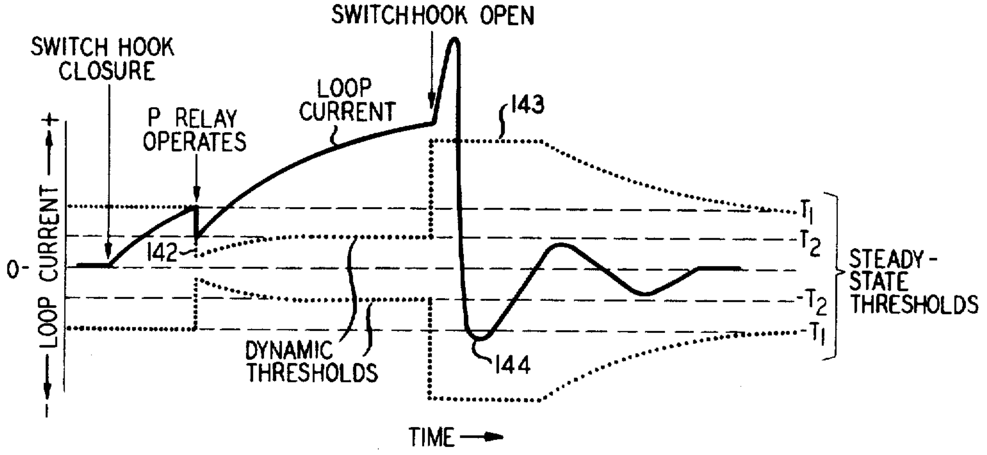
FIG. 3 is a graph depicting thresholds of the range extender pulsing level detector.

With operation of relay P, the shunt 117 path thus established reduces momentarily the amount of current seen by loop current detector 113. The input V to pulse level detector 120 is correspondingly reduced. To prevent input V from going below the threshold of detector 120 which would cause AND gate 124 output to disappear and deenergize the relay P, detector 120 in response to loop closure reduces its threshold, as depicted in FIG. 3. Also, when the switchhook opens loop 104 thereby causing oscillatory transients due to energy exchange between pulsing relay A and the loop capacitance, a reverse threshold shift in detector 120 prevents a false operation of the relay P. Positive and negative thresholds are shown in FIG. 3 since loop current detector 113 is operative with loop currents in either direction.

More specifically, as seen in FIG. 3, following closure of switchhook 102 current in loop 104 begins to build up. When after 3–6 milliseconds, current reaches the threshold designated $T_1$, detector 120 generates an output which energizes relay P via AND gate 124 and OR gate 125. Shunt 117 reduces momentarily the loop current; but concurrently detector 120 responds by dynamically shifting its detection threshold to a point, designated 142, sufficiently below the instantaneous loop current dip to prevent release of relay P. Advantageously, circuit operation is made stable for all values of loop current by the concurrent expedient of shifting the steady state threshold to the level designated $T_2$.

When the switchhook 102 next opens the loop, the steady state threshold is reshifted to level $\pm T_1$. The dynamic threshold, however, is increased beyond level $T_1$ temporarily to a level designated 143 such that relay P—once taken down—is prevented from being falsely operated by pulsing relay surges which could exceed (as depicted by point 144) the steady state levels $\pm T_1$.

Functions Supplied in Transmission Path

Figure 4:
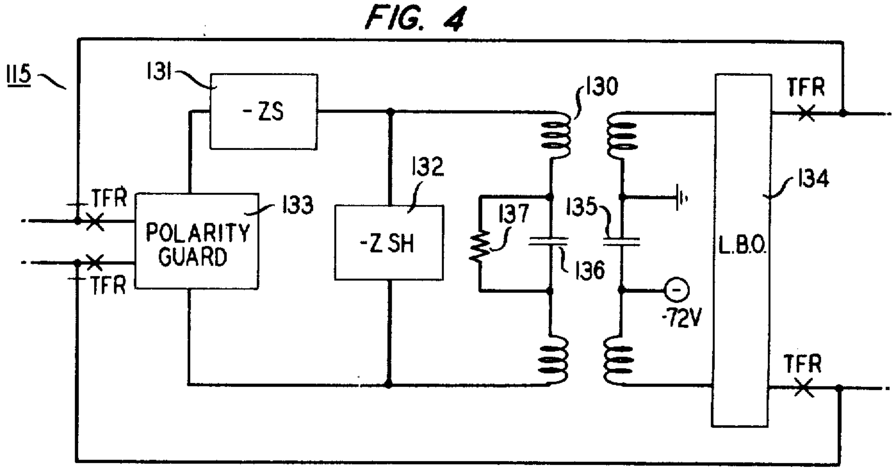
FIG. 4 is a circuit diagram of elements in the transmission path.

Whenever relay TFR is operated, the loop signaling path is broken and a circuit as shown in FIG. 4 is inserted into loop 104. This circuit consists of a transformer 130, a series negative impedance gain unit 131, a shunt negative impedance gain unit 132, a polarity guard 133 and a line buildout network 134. Gain units 131, 132 provide variable loop gain respectively depending on loop length. Current supplied to gain units 131, 132 by supervisory relays such as relay A in FIG. 1. The current-supplying relay advantageously is held by the drawn current. Capacitors 135, 136 keep the ac paths intact; and resistor 137 provides impedance to control dc current level.

Polarity guard 133 permits the range extender to operate with reversal of battery between tip and ring. Guard 133 also makes possible the connection shown of transformer 130; this connection tends to produce flux cancellation in transformer 130 and prevents it from saturating due to the dc current it supplies the loop. A negative voltage greater than −48 volts, for example, −72 volts, is supplied to transformer 130 to increase the output of the transmitter at station 101.

The line buildout network 134 takes further advantage of the presence of transformer 130 to obtain an impedance transformation to match gain units 131, 132 to the loop to maintain a satisfactory return loss characteristic.

Loop Current Detector

Pursuant to one aspect of the invention, loop current detector 113 generates two signals, termed inputs V, V′, both of which are approximately linearly proportional to loop current, and which differ only by their rise-fall time characteristic. The input V going to pulsing level detector 120 is generated by a function that has a rise time and fall time of about 0.2 milliseconds, a relatively small lag. The input V′ destined for ring-trip level detector 118 has a much larger rise and fall time, the range of which advantageously is from approximately 25 to 500 milliseconds, and most preferably about 200 milliseconds. The latter provides discrimination between 20 Hz ringing current and the dc loop current which signifies an answer.

Figure 5:
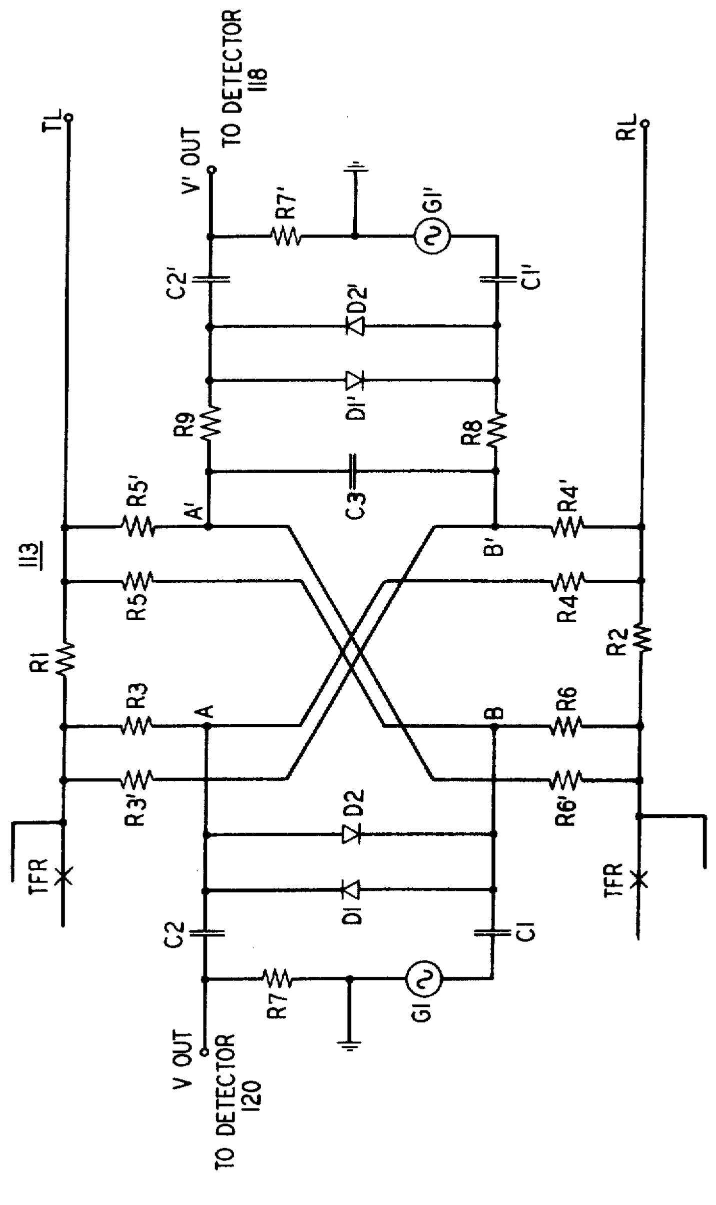
FIG. 5 is a circuit diagram of the range extender loop current detector.

One illustrative embodiment of the loop current detector 113 is depicted in FIG. 5. The subcircuit producing input V to detector 120 will first be described. Resistors $R_1$ and $R_2$ of low resistance are connected respectively in the tip, ring paths of loop 104. Resistors $R_3$ and $R_4$, and resistors $R_5$ and $R_6$ constitute two branches cross-connected between resistors $R_1$ and $R_2$ as shown. The high resistive values of resistors $R_3$, $R_4$, $R_5$, and $R_6$ cause negligible transmission loss, negligible coupling of the sensing frequency to loop 104, and minimize measurement errors made from the local test desk. A pair of diodes $D_1$, $D_2$ are connected with opposite polarity across points A and B of the bridge. A sensing frequency source $G_1$ produces signal of low power and of the order 20 kHz, which is coupled through capacitor $C_1$ to the diodes $D_1$, $D_2$. The input V to detector 120 is taken from the junction of capacitor $C_2$ and resistor $R_7$ with respect to ground.

The dc current in loop 104 produces a small voltage drop across resistors $R_1$ and $R_2$. This voltage also appears across points A and B, producing a signal that is linearly proportional to loop current, and tending to forward-bias one of the oppositely poled diodes $D_1$, $D_2$ depending on the signal polarity. A sine wave signal from source $G_1$ is coupled to the diodes by capacitor $C_1$ whose peak amplitude is typically about 150 mV. During one-half of the sinusoid, this voltage adds to the forward bias on the one diode, and hence energy is delivered to coupling capacitor $C_2$. In the second half, the sinusoidal voltage subtracts from the diode's dc bias and allows capacitor $C_2$ to discharge through the bridge resistors $R_3$ and $R_4$. The resulting voltage is advantageously taken across resistor $R_7$. A suitable setting of the RMS signal level in source $G_1$ renders this output substantially linearly proportional to loop current.

If current flows in only one side of loop 104 as occurs, for example, during the ringing of gas tube ringers, it causes only half of the loop voltage to appear across points A and B, that would be caused by full loop current of the same magnitude. Further, longitudinal currents cause voltage drops across $R_1$ and $R_2$ to cancel, resulting in no voltage difference across A and B tracing to longitudinal currents.

The subcircuit in FIG. 5 that produces input V′ to ring-trip level detector 118 is the same as that just described, with like components identified with primed designators. In addition, by virtue of a low-pass filter formed by capacitor $C_3$ and resistors $R_8$, $R_9$, output V′ does not respond significantly to 20 Hz ringing current, due to its slow rise-fall time response which prevents the diodes $D_1$, $D_2$ from being biased by ringing current in a forward direction. A dc component of loop current will, however, bias the diodes and cause an output. As a result, answer can be detected in the presence of ringing by observing when dc current has exceeded a given threshold level, in the neighborhood of 10–12 mA.

Compatibility with Ringing Signals and Various Tests

The range extender of the present invention is fully compatible with substantially all types of ringing signals put out by the central office so that no modification of ringing signal is needed. Thus, single party, two party, four party selective or semiselective, and ten party divided code ringing are handled by the disclosed range extender. The compatibility stems from the fact that only a small amount of resistance, namely resistors $R_1$ and $R_2$ of FIG. 5, is added to the loop during ringing by the range extender. The ringing signals, therefore, pass through the range extender without any notable modification.

Additionally, ANI (automatic number identification) tip party tests, LIT (line insulation test frame) tests, and tests made from the local test desk, all pass through the range extender which is transparent to them because the test currents are not sufficient in magnitude to exceed the thresholds in pulse level detector 120. The range extender remains in the signaling mode when the loop is open during the test, but shifts to the transmission mode if the loop is closed and talking battery is supplied to the loop.

The spirit of the invention is embraced in the scope of the claims to follow.

What is claimed is:

1. A telephone subscriber loop range extender comprising: input and output terminals serially connected in said loop, a shunt circuit connected across said loop and comprising a resistive element and a first contact, a first relay for controlling said first contact, a first AND gate with means connecting the output of said first AND gate to said first relay, said gate fed with first, second, and third input signals and including means for logically inverting said second and third input signals, a loop current detector comprising first and second means responsive to loop current flow for generating first and second signals each proportional to loop current, said first signal reporting loop current substantially instantaneously and said second signal having a delayed response, said second means further comprising means for substantially filtering out ringing current, a pulsing level detector, responsive to values of said first signal from said loop current detector greater than preselected threshold levels for generating said first AND gate input signal, a line voltage detector responsive to either ringing voltage or relay surge voltage for generating said second AND gate input signal, and a ringing presence detector connected to said line voltage detector and responsive to ringing voltage for generating said third AND gate input signal.

2. A range extender as per claim 1, further comprising:

a signaling path and a transmission path, means connected in said transmission path for effecting voice frequency gain, transfer switch means for connecting said loop through said signaling or said transmission path, a second relay controlling said transfer switch means which when operated establishes said transmission path, and which when unoperated establishes said signaling path, and means including a timer connecting said first AND gate output and said second relay, energizing of said first AND gate effecting a delayed operation of said second relay.

3. A range extender as per claim 2, wherein said connecting means comprises:

a two-input OR gate for controlling said first relay, said OR gate having a first input from said first AND gate, said range extender further comprising a second AND gate providing a second input to said OR gate and itself having a first input from said ringing presence detector and a second input, and a ring-trip level detector comprising means responsive to values of said second loop current detector output signal above a selected level for generating said last-named second input.

4. A range extender in accordance with claim 3, wherein said transfer switch means further comprises a break contact in the connection between said first relay and said OR gate 5. A range extender in accordance with claim 4, wherein the response of said loop current detector second signal has a rise time of from 25 to 500 milliseconds and a like fall time.

6. A range extender in accordance with claim 4, wherein said timer comprises means effecting a delay of 100–150 milliseconds in the operation of said second relay.

7. A range extender in accordance with claim 4, wherein said means for effecting voice frequency gain comprises a series negative impedance gain unit and a shunt negative impedance gain unit for providing variable loop gain as a function of loop resistance.

8. A range extender in accordance with claim 4, wherein said loop current detector first output signal generating means comprises:

circuit means comprising first and second low resistance elements connected in tip-and-ring leads of said loop, and a pair of branch circuits cross-connected with respect to said first and second low resistance elements and each including first and second high resistance elements, for sensing loop current and concurrently canceling the effect of longitudinal current on said first output signal;

a network comprising first and second paths connected to the respective midpoints of said branch circuits and a pair of oppositely poled diodes connected in shunt relation across said first and second paths, the dc loop current tending to forward-bias one of said diodes;

a medium frequency sine wave signal source; and a high voltage isolation coupling circuit connecting said source to said first and and second paths, said coupling circuit transferring energy from said source to said output through said diodes in response to loop current.

9. A range extender in accordance with claim 8, wherein said loop current detector second output signal operating means comprises a circuit substantially identical to that recited in claim 8, and which further comprises means for preventing said diodes from being forward-biased by ringing current.

* * * * *